United States Patent
Zhou et al.

(10) Patent No.: US 11,288,884 B2
(45) Date of Patent: Mar. 29, 2022

(54) UAV REAL-TIME PATH PLANNING METHOD FOR URBAN SCENE RECONSTRUCTION

(71) Applicant: Beihang University, Beijing (CN)

(72) Inventors: Bin Zhou, Beijing (CN); Qi Kuang, Beijing (CN); Jinbo Wu, Beijing (CN); Qinpin Zhao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 82 days.

(21) Appl. No.: 16/997,833

(22) Filed: Aug. 19, 2020

(65) Prior Publication Data

US 2021/0158009 A1    May 27, 2021

(30) Foreign Application Priority Data

Nov. 21, 2019   (CN) .......................... 201911146357.X

(51) Int. Cl.
| | |
|---|---|
| *G06V 20/13* | (2022.01) |
| *G06T 7/80* | (2017.01) |
| *B64C 39/02* | (2006.01) |
| *G06V 10/75* | (2022.01) |
| *G06N 3/04* | (2006.01) |
| *G06V 10/40* | (2022.01) |

(52) U.S. Cl.
CPC ............ *G06V 20/13* (2022.01); *B64C 39/024* (2013.01); *G06T 7/80* (2017.01); *G06V 10/757* (2022.01); *B64C 2201/123* (2013.01); *B64C 2201/127* (2013.01); *G06N 3/04* (2013.01); *G06V 10/513* (2022.01)

(58) Field of Classification Search
CPC .... G06V 20/13; G06V 10/757; G06V 10/513; G06V 20/10; G06V 20/17; G06V 20/176; B64C 39/024; B64C 2201/123; B64C 2201/127; B64C 2201/14; G06T 7/80; G06T 2207/10032; G06T 2207/30241; G06T 7/579; G06T 7/73; G06T 17/10; G06N 3/04; G06N 3/0454; G06K 9/6271; G01C 21/20; G05D 1/101
USPC ........................................................ 382/103
See application file for complete search history.

(56) References Cited

U.S. PATENT DOCUMENTS

| | | | |
|---|---|---|---|
| 2017/0248969 A1* | 8/2017 | Ham | G01S 17/86 |
| 2018/0204469 A1* | 7/2018 | Moster | G05D 1/0094 |
| 2019/0311546 A1* | 10/2019 | Tay | G06T 5/50 |

(Continued)

*Primary Examiner* — Jerome Grant, II
(74) *Attorney, Agent, or Firm* — Dragon Sun Law Firm, PC; Jinggao Li, Esq.

(57) ABSTRACT

A method for urban scene reconstruction uses the top view of a scene as priori information to generate a UVA initial flight path, optimizes the initial path in real time, and realizes 3D reconstruction of the urban scene. There are four steps: (1): to analyze the top view of a scene, obtain the scene layout, and generate a UAV initial path; (2): to reconstruct the sparse point cloud of the building and estimate the building height according to the initial path, combine the scene layout to generate a rough scene model, and adjust the initial path height; (3): to use the rough scene model, sparse point cloud and the UAV flight trajectory to obtain the scene coverage confidence map and the details that need close-ups, optimize the flight path in real time; and (4): to obtain high resolution images, reconstruct them to obtain a 3D model of the scene.

4 Claims, 3 Drawing Sheets

(56) References Cited

U.S. PATENT DOCUMENTS

| | | | |
|---|---|---|---|
| 2019/0317217 A1* | 10/2019 | Day | G01S 7/4808 |
| 2019/0324475 A1* | 10/2019 | Dean | G01C 21/3469 |
| 2020/0158875 A1* | 5/2020 | Feng | G01S 7/4808 |
| 2020/0182969 A1* | 6/2020 | He | G01S 7/4808 |
| 2021/0097858 A1* | 4/2021 | Moretti | G05D 1/0214 |
| 2021/0150098 A1* | 5/2021 | Priest | G06Q 10/103 |
| 2021/0263515 A1* | 8/2021 | Henry | G05B 13/0265 |

* cited by examiner (a)        (b)        (c)

UAV REAL-TIME PATH PLANNING METHOD FOR URBAN SCENE RECONSTRUCTION

CROSS-REFERENCE TO RELATED PATENT APPLICATION

This application claims priority to and the benefit of CN 201911146357X, filed Nov. 21, 2019, entitled "UAV Real-Time Path Planning Method for Urban Scene Reconstruction," by Bin ZHOU et al. The entire disclosure of the above-identified application is incorporated herein by reference.

TECHNICAL FIELD

The present disclosure relates to an Unmanned Aerial Vehicle (UAV) real-time path planning method for urban scene reconstruction, which uses the top view of a scene as priori information to generate a UVA initial flight trajectory, optimizes the initial trajectory in real time during the flight process, and in the end realizes image acquisition and 3D modeling of the urban scene. It has certain effectiveness and universality, and belongs to the field of robot path planning and computer graphics.

BACKGROUND

With the rise of "digital cities", 3D reconstruction of urban scenes is becoming a hotspot in current research. Constructing 3D models of urban scenes can be widely used in urban planning, urban supervision, urban image promotion, real estate development and other fields. However, due to the complexity of the urban scene environment and the pretty large scale thereof, 3D reconstruction is also difficult. UAVs can collect data in the air and have a wide range of perspectives, so have become one of the ideal collection tools for urban 3D reconstruction.

In order to obtain satisfactory reconstruction results, a UAV needs to collect enough images capable of covering the entire scene to completely reconstruct the scene. At present, most UAVs are manually controlled by people. However, due to the lack of directly perceivable reconstruction results, it is impossible to know whether the collected data is comprehensive during the data collection process. It can only be judged after the 3D model is reconstructed. The whole process needs more than one flight collection, thus being time-consuming and laborious. Due to the short flight time of the UAV in the air, it is necessary to efficiently collect useful data. At the same time, in order to improve the quality of the reconstruction results, many complex details need to be shot at close range, such as hollow parts, awnings, flower beds, etc.

With the increasing demand for urban modeling and UAV intelligent path planning, some researchers have conducted research on related technologies in recent years. Most of the current work is to plan the UAV path based on the problem of perspective selection, and on the basis of reconstructing a rough scene model, calculate the optimal observation angle by calculating the completeness of the rough model, then generate a flight path that passes through all the optimal angles, and in the end collect high-resolution images in the scene by an UAV according to the set optimal path, to reconstruct a fine urban 3D model through 3D reconstruction algorithms. However, this method needs to reconstruct a rough model as priori information in advance, so an UAV is required to first collect a small amount of data for reconstruction, which greatly increases the complexity and completion time.

Therefore, a heretofore unaddressed need exists in the art to address the aforementioned deficiencies and inadequacies.

SUMMARY

The technology of the present disclosure solves the problem of, to overcome the shortcomings of the prior art, providing a UAV real-time path planning method for urban scene reconstruction, which uses the top view of a scene as priori information to generate a UVA initial flight trajectory, optimizes the initial trajectory in real time during the flight process, and in the end realizes image acquisition and 3D modeling of the urban scene. The present disclosure has strong robustness, solves the problem that the prior art needs to use rough models as a priori for path planning, which is time-consuming and laborious, and breaks the limit of the current technology being difficult to generate a urban 3D model with details.

The technical solution adopted by the present disclosure is: a UAV real-time path planning method for urban scene reconstruction, including the following actions or steps to:

(1) Analyze the top view of a scene to obtain the layout of the scene, determine a safe flight area for the UAV according to the scene layout, generate in the safe flight area, a UAV initial flight path with a fixed height and that traverses each side of the building, and at the same time give each building the same initial height value, add the orientation of lens to the UAV initial flight path according to geometric constraints, so that the building photographed is in the center of the screen;

(2) Reconstruct a sparse point cloud of the building during the flight process according to the initial flight path, use the sparse point cloud to estimate the height of the building, then combine the scene layout obtained in step (1) to generate a rough scene model, and at the same time optimize the initial flight path according to the height of the building, to generate a flight path with varying heights;

(3) By means of the rough scene model generated in step (2), and based on the sparse point cloud and the UAV flight trajectory, predict the completeness of the scene collection information and judge the details of the building to obtain the confidence map of scene coverage and the details in need of close-up shots, and optimize the flight path in real time to obtain a UAV flight path that can complete the scene collection information in real time and shoot close-ups of the building details;

(4) In the process of flying according to the optimized UAV flight path, obtain high-resolution images with more than 19 million pixels, and use multi-view stereo geometric technology to obtain a complete urban scene 3D model with building details through reconstruction of high-resolution images.

The step (1) is specifically implemented as the following actions or steps to:

(2.1) Segment out the buildings in the top view of the scene, use the Mask R-CNN instance segmentation neural network to segment out each building to obtain the layout of the scene, and determine a UAV safe flight area according to the scene layout, that is, the area other than that above the building, wherein the buildings at the time are not connected, and there is a disconnected graph.

(2.2) To generate a coherent UAV flight path, need to convert the disconnected graph in step (2.1) to a connected graph, view each building as a point, the paths between buildings as edges, and the distances between buildings as the weights of edges; the shortest path through each point is obtained by the Dijkstra algorithm, this path is the shortest path through each building; at the time, each building in the scene is represented by a geometric shape, any two points of the building are connected by paths, and a connected graph is constructed;

(2.3) obtain the connected graph through step (2.2); at the time, in order to save flight time, need to obtain a shortest path that traverses each side of the building; add repeated edges to make the connected graph become an Euler graph, then use the Fleury algorithm to find the optimal Euler tour, wherein the optimal Euler tour obtained at the time is the UAV initial flight path with a fixed height in the safe flight area and that traverses each side of the building;

(2.4) Give each building an initial height, calculate the orientation of lens according to geometric constraints, and add the lens orientation to the UAV initial flight path based on step (2.3), so that the top and side of the building can be photographed at the same time, the photographed building is in the center of the screen, and the initialization of the path is completed.

The step (2) is specifically implemented as follows:

(3.1) During the UAV flight along the initial flight path generated in step (1), when photographing the current building, match the photographed image with the top view of the scene in step (1), and extract a Scale Invariant Feature Transform (SIFT) feature to determine the area of the building in the current shot;

(3.2) Reconstruct a sparse point cloud of the building by SLAM, search points in the area determined in step (3.1), determine the heights of the points according to the maximum and minimum values of the points in the area on the z-axis;

(3.3) After determining the heights of the points, determine the scaling ratio according to the size of the top area of the building and the size of the actual building top, multiply the heights of the points and the scaling ratio to unify the scale of the reconstructed sparse point cloud, and restore the real height of the building;

(3.4) On the basis of the obtained scene layout, combine the real height of the building obtained in step (3.3) to generate a rough model of the scene, optimize the initial flight path according to the real height of the building, and readjust the height of the initial flight path to calculate the orientation of lens.

The step (3) is specifically implemented as follows:

(4.1) Combine the rough scene model of step (3.4) to predict the completeness of the scene collection information, determine the area covered by the UAV based on the sparse point cloud recovered by SLAM, and determine the possible coverage area according to the recovered UAV flight path to generate a scene coverage confidence map;

(4.2) For the remaining uncovered area, calculate the points to be added to the path and the orientation of the onboard camera lens, optimize the UAV flight path in real time, and enable the UAV to complete the scene collection information in real time;

(4.3) While reconstructing the sparse point cloud, judge the details of the building, calculate the density of the sparse point cloud, and determine the area with the density of the sparse point cloud fairly great, that is, with more than 10 points per cubic meter, and optimize the flight path so that the UAV can shoot close-ups of the complex parts of the building like the balcony, water tank and fire ladder.

Compared with the prior art, the beneficial features of the present disclosure are:

(1) The current UAV path planning method used for urban scene reconstruction cannot achieve real-time planning, and requires the reconstructed rough model as priori information, and thus needs to reconstruct a rough model in advance, which takes a long time. The present disclosure overcomes the limitation of the current method, uses the top view of the scene as priori information, optimizes the flight path in real time during the flight, and requires no multiple UAV flights, greatly reducing the total time.

(2) At present, urban manual modeling requires professional designers to conduct manual design and modeling, which is time-consuming and laborious. The method proposed in the present disclosure is simple and effective. Compared with the current urban manual modeling method, it does not require manual operation by the user, and it does not require the user to possess any professional skills. By planning the UAV flight path, it enables the UAV to automatically collect images of the urban scene, then uses the stereo vision technology to complete the automatic reconstruction of the urban scene.

(3) The manual remote control UAV surveying method requires the user to control the UAV to collect images, which lacks directly perceivable reconstruction results, and often requires multiple flights to ensure complete reconstruction. The method of the present disclosure combines scene reconstruction's point cloud and UAV trajectory, predicts the scene coverage and optimizes the trajectory to complete the reconstruction results, which solves problems in urban surveying such as lack of directly perceivable results, low collection efficiency and poor reconstruction effects, and does not require users to control the UAV.

(4) In the traditional aerial mapping method, the flying height of the UAV is fixed, being unable to capture the details of the building at close range, so the reconstruction result is incomplete, the accuracy is not high, and the parameters need to be manually set. The method of the present disclosure comprehensively considers the different heights of the building, and the details that need close-ups, uses the sparse point cloud reconstructed during the flight and the scene layout to estimate the building height, predicts the completeness of the scene collection information, and judges the building details, which is able to optimize the flight path in real time according to the building height, scene collection completeness and building details. The reconstruction results have higher accuracy, cover more area, and are more intelligent than traditional aerial mapping methods.

(5) The present disclosure, verified by experiment, is feasible, accurate and universal, and can be used in 3D modeling of cities, automatic surveying and mapping, electronic sand table and other applications.

DESCRIPTION OF FIGURES

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION

Figure 1:
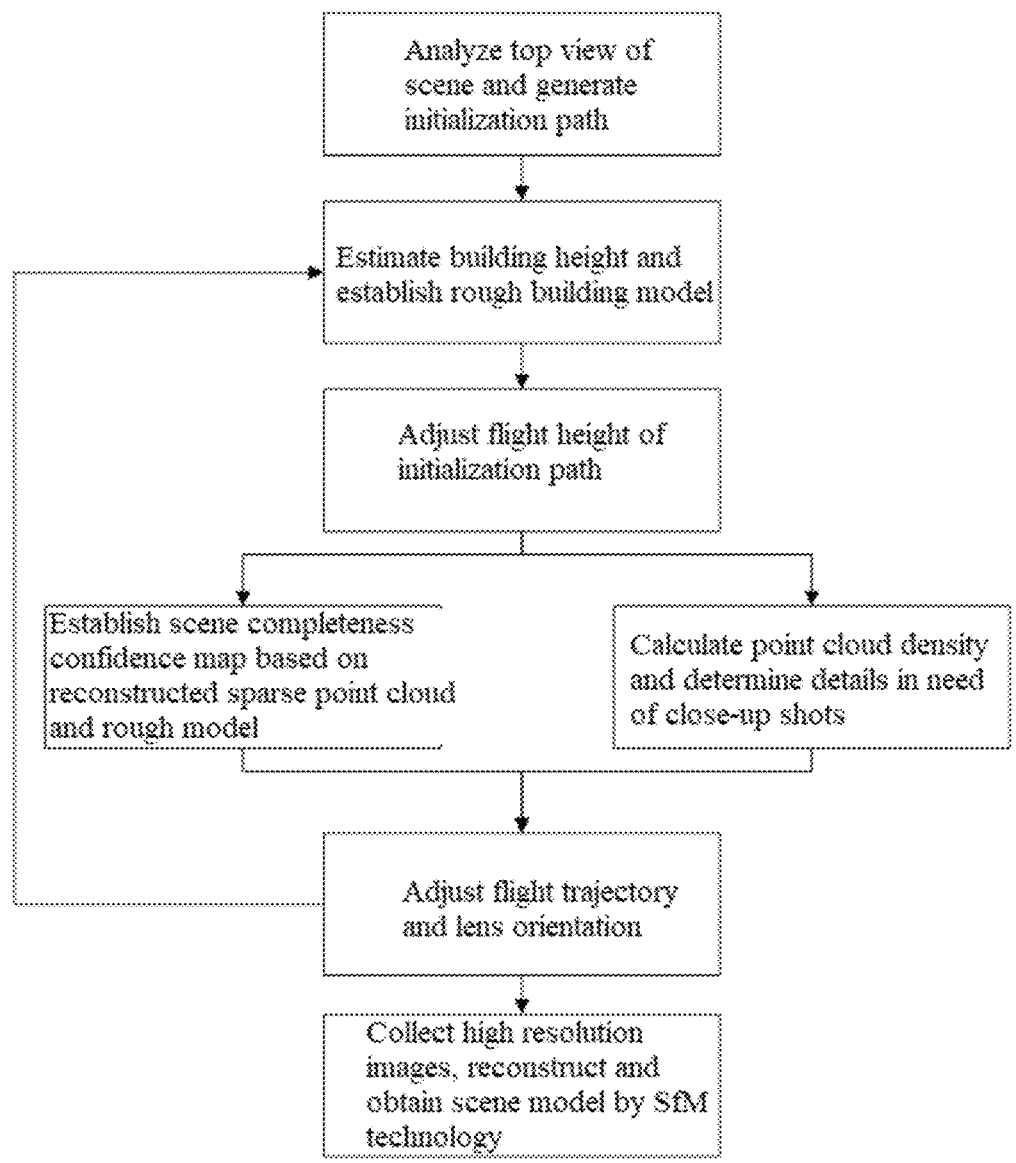
FIG. 1 is a flowchart of the present disclosure.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

In order to better understand the technical solution of the present disclosure, the specific mode of carry out the present disclosure is further described below with reference to the drawings.

FIG. 1 is a flowchart of the present disclosure. The overall objective of the present disclosure is to propose a UAV real-time path planning method for urban scene reconstruction, which enables the UAV to optimize the flight path in one flight in real time, collect comprehensive information to complete the 3D reconstruction of the scene. The specific steps are to: first analyze the top view of a scene to obtain the layout of the scene and generate a UAV initial flight path with lens orientation; reconstruct the sparse point cloud of the building during the flight, estimate the height of the building from the point cloud, and combine the obtained scene layout to generate a rough scene model and adjust the height of the initial path; by means of the rough scene model and according to the sparse point cloud and the UAV flight path, obtain the confidence map of scene coverage and the details in need of close-up shots, and optimize the flight path in real time; and obtain high-resolution images, which are reconstructed to obtain a 3D model of the scene.

Figure 2:
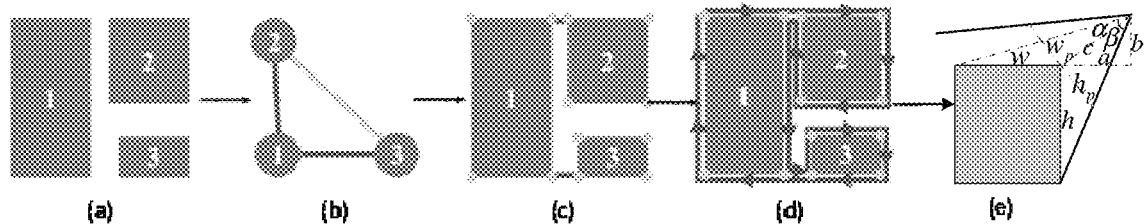
FIG. 2 is a schematic diagram of a path initialization flowchart of the present disclosure.

As shown in FIG. 2, the method of the present disclosure first uses the instance segmentation model Mask R-CNN to obtain the top image (a) of the building in the map. Since each building is independent, and the flight path of the UAV is coherent, it is required to convert the image (a) to a connected graph. Each building is viewed as a point in the image, and the weight of the edge between points is the distance between buildings, as shown in image (b). The shortest path (c) through each building is obtained by Dijkstra's shortest path algorithm. At the time, in order to obtain the path traversing the side of each building, it is required to add repeated edges to make the connected graph being an Euler graph, and then use the Fleury algorithm to find the optimal Euler tour, wherein the finally obtained optimal Euler tour (d) is the shortest path that passes through each edge and may pass through some edges for more than once. Then an initial height is assigned to each building, and according to the following geometric constraint (e), the position and orientation of the camera are obtained:

$$\begin{cases} \dfrac{\sin\left[\pi - (\alpha + \beta) - \left(\dfrac{\pi - fov}{2}\right)\right]}{c} = \dfrac{\sin\alpha}{w_p} \\ \dfrac{\sin\left(\dfrac{\pi - fov}{2}\right)}{c} = \dfrac{\sin\beta}{h_p} \end{cases}$$

wherein, fov is the angle of view of the camera, α and β are the angle between the sides of the building and the camera in FIG. 1, c is the distance between the camera and the building, $w_p$ and $h_p$ are the length of the width w and height h of the building respectively imaged on the camera plane.

Figure 3:
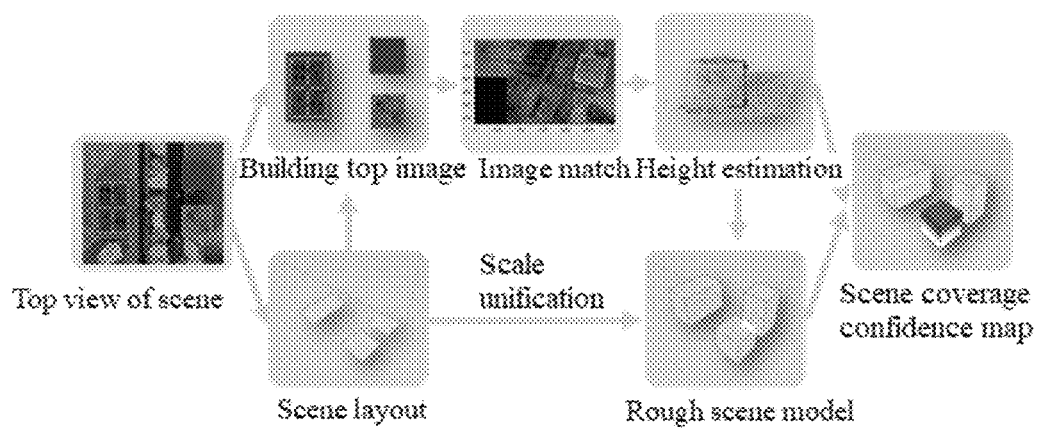
FIG. 3 is a schematic diagram of the scene completeness prediction process of the present disclosure.

As shown in FIG. 3, a schematic diagram of the scene completeness prediction process of the present disclosure is illustrated: First, the UAV flies according to the initial path, and uses the SLAM technology to reconstruct the sparse point cloud of the scene and estimate the camera pose during the flight; then estimate the height of the building currently photographed, match the image currently taken by the UAV with the image of the roof of the previously obtained building, and determine the area of the building in the current image by extracting the SIFT feature; the difference between the point $z_m$ with the largest value and the point $z_n$ with the smallest value on the z-axis in the area is taken as the height of the building; and at the same time, because the scale of the monocular camera is uncertain, the real height h of the building needs to be determined by the real scale s of the top view:

$$h = s \cdot \left(\frac{1}{M}\sum_{m=1}^{M}\max(z_m) - \frac{1}{N}\sum_{n=1}^{N}\min(z_n)\right)$$

wherein, M is the number of points with the largest value on the z-axis in the area, and N is the number of points with the smallest value on the z-axis in the area.

After the height of the building is determined, the height of the UAV initial path and the orientation of lens are adjusted according to the height of the building, and the already obtained scene layout is combined to generate a rough model of the scene. By means of the rough scene model and sparse point cloud, the completeness of the scene is predicted to generate a confidence map of the scene coverage. Each face of the building is divided into several small grids, and for each small grid g its confidence E(g) can be expressed as:

$$E(g) = \left[I(n_p - n_{th}) + \sum_{i=m-\Delta m}^{m+\Delta m}I(t_i)\sin(t_i)\right]\cdot G(g)$$

wherein, $I(n_p - n_{th})$ is that the number of points in the small grid exceeds the threshold, then it is considered that this small grid has been covered. $\Sigma_{m-\Delta m}^{m+\Delta m}I(t_i)\sin(t_i)$ is based on the trajectory of the UAV to predict whether the grid is covered, $t_i$ is the angle between the lens orientation and the plane where the grid is located. G(g) is a function that measures the distance between the UAV and the observation plane:

$$G(g) = \frac{1}{\sqrt{2\pi}\,\sigma}\exp\left(-\frac{\left(\dfrac{S_g}{\lambda S_f} - 1\right)^2}{2\sigma^2}\right)$$

This function is represented by a Gaussian distribution, where) represents the proportion that the small grid area $S_g$ expects to occupy in the screen $S_f$, σ controls how fast the metric changes with the distance between the UAV and the observation plane.

After the scene coverage confidence map is generated, the UAV trajectory needs to be optimized so that uncovered areas can be collected. For the uncovered area, first the center point is taken as the point of the path to be added, and then the time cost between points is calculated. For any two points $p_1$, $p_2$, the time cost C is:

$$C(p_1,p_2)=\min[C_s(p_1,p_2),C_t(p_1,p_2)],$$

wherein, $C_s$ represents the UAV from the side of the building to another point, and $C_t$ represents the UAV from the top of the building to the destination. Of the two, the one with less time is chosen as the optimal path. When points are added to the path, the times of the two strategies are calculated to complete $C_i$ immediately and complete $C_d$ later, and then the strategy with the least time is selected. The immediate completion requires the UAV from the current point to the destination point, and the round-trip time needs to be calculated, whereas the later completion is to calculate the time required from the point closest to the destination point to the destination point in the path:

$$\underset{P}{\operatorname{argmin}} T = \underset{P}{\operatorname{argmin}}\{\min[2C_i(p_c,\ p_a),\ C_d(p_{close},\ p_a)]\}$$

wherein, P represents the path to be sought, T is the length of time that needs to be added after the point is added, $p_c$ is the current location of the UAV, $p_a$ is the destination point, and $p_{close}$ is the point closest to the destination point in the path.

Figure 4:
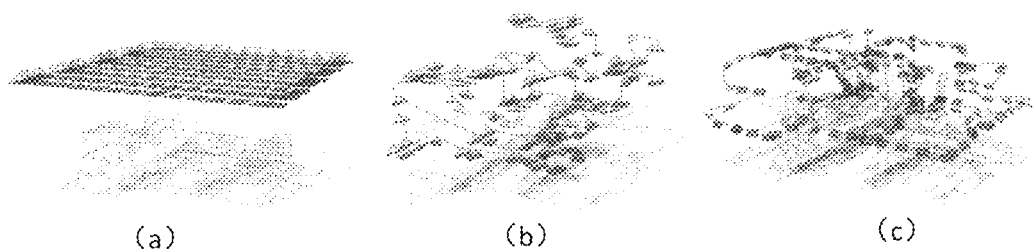
FIG. 4 is an application sample diagram of the UAV real-time path planning of the present disclosure.

FIG. 4 is an application example diagram of the UAV real-time path planning of the present disclosure, which shows the benefits and advantages of the present disclosure in terms of time and collection efficiency. The advantages of the present disclosure are that: the UAV has a wide range of information collection angles, and because of the comprehensive information during reconstruction, the effect is better; the redundant information obtained by the collection is less, and the utilization rate is high, so the number of images collected in the same scene is less than the traditional collection method, and the reconstruction time is significantly reduced; the reconstructed rough model is not used as priori information, so there is no need to fly the UAV multiple times, thus saving time and effort; during the collection, the movement of the UAV is more in line with the manner of robot exploring environment, and the correlation between the images is high, so there are fewer errors during reconstruction. (a) is the traditional aerial mapping method, wherein the UAV is flying at a fixed height in the scene in the form of a polyline, and the lens orientation is also fixed, so the angle of the collected information is single, and many parts are not complete during reconstruction; (b) is presently more advanced method of using UAV to reconstruct the scene, which uses the rough model reconstructed in advance as priori information, calculates the best angle of view, and then uses the path to connect the angle of view, so the correlation between the images is not high, and it takes a lot of time to calculate the image correlation during reconstruction; and (c) is the result of the path planning of the present disclosure. Table 1 compares the reconstruction time (min) and reconstruction error (cm) under these three methods. It can be seen from Table 1 that the method of the present disclosure greatly reduces the time of the entire process where the reconstruction accuracy is similar to the Smith method.

TABLE 1

| Method | Comparison of reconstruction time (min) and reconstruction error (cm) | | | |
| --- | --- | --- | --- | --- |
| | Flight Time | Reconstruction Time | Total Time | Reconstruction Error |
| Traditional Surveying | 36.60 | 112.70 | 161.48 | 5.57 |
| Smith | 42.49 | 243.12 | 302.65 | 5.10 |
| Present disclosure | 23.73 | 146.84 | 185.77 | 5.11 |

Figure 5:
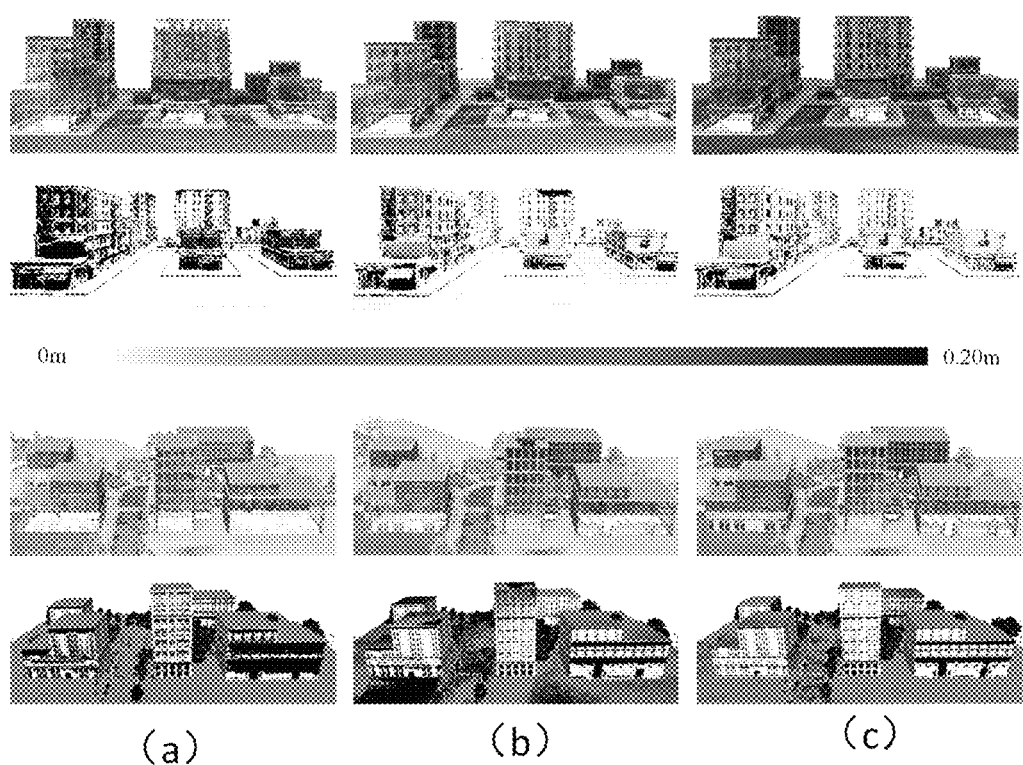
FIG. 5 is an application sample diagram of the urban scene reconstruction of the present disclosure.

In the method of the present disclosure, the initialization path traverses every side of the building to effectively collect the information of each building, the reconstruction accuracy is high, the flying distance of the UAV is short, and the time consumed is less. After combining the height, completeness and details etc. of the building, the initial path is optimized in real time, which further improves the accuracy and completeness of the reconstruction. The experimental results prove the feasibility, accuracy and universality of the method of the present disclosure. The experimental results are shown in FIG. 5. FIG. 5 shows the reconstruction result and reconstruction error under the traditional aerial mapping method, the path initialization method of the present disclosure, and the optimization method of the present disclosure. Among them, in (a), the traditional aerial mapping method, due to the fixed flying height of the UAV and the fixed orientation of the lens, has relatively large reconstruction errors of the building side. In (b), compared with the traditional aerial mapping method, the initialization method can reconstruct the side of the building more completely, but the accuracy is also not high either due to the fixed height and the lack of details. In (c), the optimization method of the present disclosure can adjust the flying height of the UAV, add close-ups of details, predict the completeness of the scene and make optimization, so the reconstructed scene model has higher accuracy and is more complete.

The above are only some basic descriptions of the present disclosure, and any equivalent transformations made according to the technical solutions of the present disclosure shall fall within the protection scope of the present disclosure.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A UAV real-time path planning method for urban scene reconstruction, comprising:
analyzing a top view of a scene to obtain a layout of the scene, determining a safe flight area for the UAV according to the layout of the scene, generating, in the safe flight area, a UAV initial flight path with a fixed height and that traverses each side of a building, and at the same time giving each building the same initial height value, and adding an orientation of lens to the UAV initial flight path according to geometric constraints, so that the building photographed is in a center of a screen;

reconstructing a sparse point cloud of the building in a flight process according to the initial flight path, using the sparse point cloud to estimate a height of the building, then combining the obtained layout of scene to generate a rough scene model, and at the same time optimizing the initial flight path according to the height of the building to generate a flight path with varying heights;

by means of the generated rough scene model, and based on the sparse point cloud and the UAV flight path, predicting a completeness of scene collection information and judging details of the building to obtain a scene coverage confidence map and the details in need of close-up shots, and optimizing the flight path in real time to obtain the UAV flight path that can complete the scene collection information in real time and shoot close-ups of the details of the building; and in a fight process according to the optimized UAV flight path, obtaining high-resolution images with more than 19 million pixels, and using a multi-view stereo geometric technology to obtain a complete urban scene 3D model with the details of the building through reconstruction of the high-resolution images.

2. The UAV real-time path planning method for urban scene reconstruction according to claim 1, wherein the step 1 is implemented as:

segmenting out the building in the top view of the scene, using Mask R-CNN instance segmentation neural network to segment out each building to obtain the layout of the scene, and according to the layout of scene, determining the UAV safe flight area that is an area other than that above the building, wherein buildings at the time are not connected, and there is a disconnected graph;

to generate a coherent UAV flight path, needing to convert the disconnected graph to a connected graph by: viewing each building as a point, paths between the buildings as edges, and distances between the buildings as weights of the edges; obtaining a shortest path through each point by Dijkstra algorithm, this path being a shortest path through each building; and at the time representing each building in the scene by a geometric shape, wherein any two points of the building are connected by paths, and the connected graph are constructed;

obtaining the connected graph; at the time, in order to save flight time, needing to obtain a shortest path that traverses each side of the building; adding repeated edges to make the connected graph become an Euler graph, and then using Fleury algorithm to find an optimal Euler tour, the optimal Euler tour obtained at the time being the UAV initial flight path with the fixed height in the safe flight area and that traverses each side of the building; and giving each building an initial height, calculating the orientation of lens according to geometric constraints, and adding the orientation of lens to the UAV initial flight path, so that top and sides of the building can be photographed at the same time, wherein the photographed building is in the center of the screen, and a path initialization is completed.

3. The UAV real-time path planning method for urban scene reconstruction according to claim 1, wherein the reconstruction is implemented as:

in the UAV flight along the initial flight path generated in step 1, when photographing a current building, matching the photographed image with the top view of the scene in step 1, and extracting a Scale Invariant Feature Transform (SIFT) feature to determine an area of the building in a current shot;

reconstructing the sparse point cloud of the building by Simultaneous Localization And Mapping (SLAM), searching points in the determined area, and determining heights of the points according to maximum and minimum values of the points in the area on z-axis;

after determining the heights of the points, determine a scaling ratio according to a size of top area of the building and a size of the actual building top, multiplying the heights of the points and the scaling ratio to unify a scale of the reconstructed sparse point cloud, and restore a real height of the building; and on the basis of the obtained layout of the scene, combining the obtained real height of the building to generate the rough scene model, and optimizing the initial flight path according to the real height of the building to readjust the height of the initial flight path and calculate the orientation of lens.

4. The UAV real-time path planning method for urban scene reconstruction according to claim 1, wherein the step 3 is implemented as:

combining the rough scene model to predict the completeness of the scene collection information, determining the area covered by the UAV based on the sparse point cloud recovered by SLAM, and determining the possible coverage area according to the recovered UAV flight path to generate the scene coverage confidence map;

for the remaining uncovered area, calculating points to be added to the path and the orientation of onboard camera lens, optimizing the UAV flight path in real time, and enabling the UAV to complete the scene collection information in real time; and while reconstructing the sparse point cloud, judging the details of the building, calculating a density of the sparse point cloud, determining an area with the density of the sparse point cloud fairly great, that is, with more than 10 points per cubic meter, and optimizing the flight path so that the UAV can shoot close-ups of complex parts of the building, like balcony, water tank and fire ladder.

* * * * *